United States Patent [19]

Kemper et al.

[11] Patent Number: 4,644,479
[45] Date of Patent: Feb. 17, 1987

[54] DIAGNOSTIC APPARATUS

[75] Inventors: Christian T. Kemper, Winter Park; James C. Bellows, Seminole, both of Fla.; Pamela J. Kleinosky, Philadelphia, Pa.

[73] Assignee: Westinghouse Electric Corp., Pittsburgh, Pa.

[21] Appl. No.: 636,195

[22] Filed: Jul. 31, 1984

[51] Int. Cl.⁴ .................. G06F 15/46; G06F 11/30
[52] U.S. Cl. .................. 364/550; 364/492; 364/554
[58] Field of Search .............. 364/431.01, 550, 551, 364/554, 556, 492, 494

[56] References Cited

U.S. PATENT DOCUMENTS

| | | | |
|---|---|---|---|
| 4,302,813 | 11/1981 | Kurihara et al. | 364/494 X |
| 4,328,556 | 5/1982 | Abe et al. | 364/492 X |
| 4,389,706 | 6/1983 | Gomola et al. | 364/492 X |
| 4,404,637 | 9/1983 | Walters et al. | 364/494 |
| 4,471,446 | 9/1984 | Podolsky et al. | 364/494 |
| 4,517,468 | 5/1985 | Kemper et al. | 364/492 X |

OTHER PUBLICATIONS

Fox et al: Techniques for Sensor Based Diagnosis, Proceedings of the Eighth International Joint Conference on Artificial Intelligence, IJCAI-83, vol. 1, pp. 158–163.

Primary Examiner—Felix D. Gruber
Attorney, Agent, or Firm—D. Schron

[57] ABSTRACT

Diagnostic apparatus utilized to monitor a steam turbine-generator power plant. A plurality of sensors around the plant provide data to the diagnostic apparatus which utilizes a digital computer to come to some conclusion relative to actual or impending malfunctions in the plant components. The computer utilizes an expert system diagnosis which establishes a plurality of subsystems which are generic and can be applied to any sensor to obtain indications of (a) sensor output movement, (b) validated sensor readings and (c) malfunction indications based on conclusions reached in (a) and (b).

37 Claims, 12 Drawing Figures

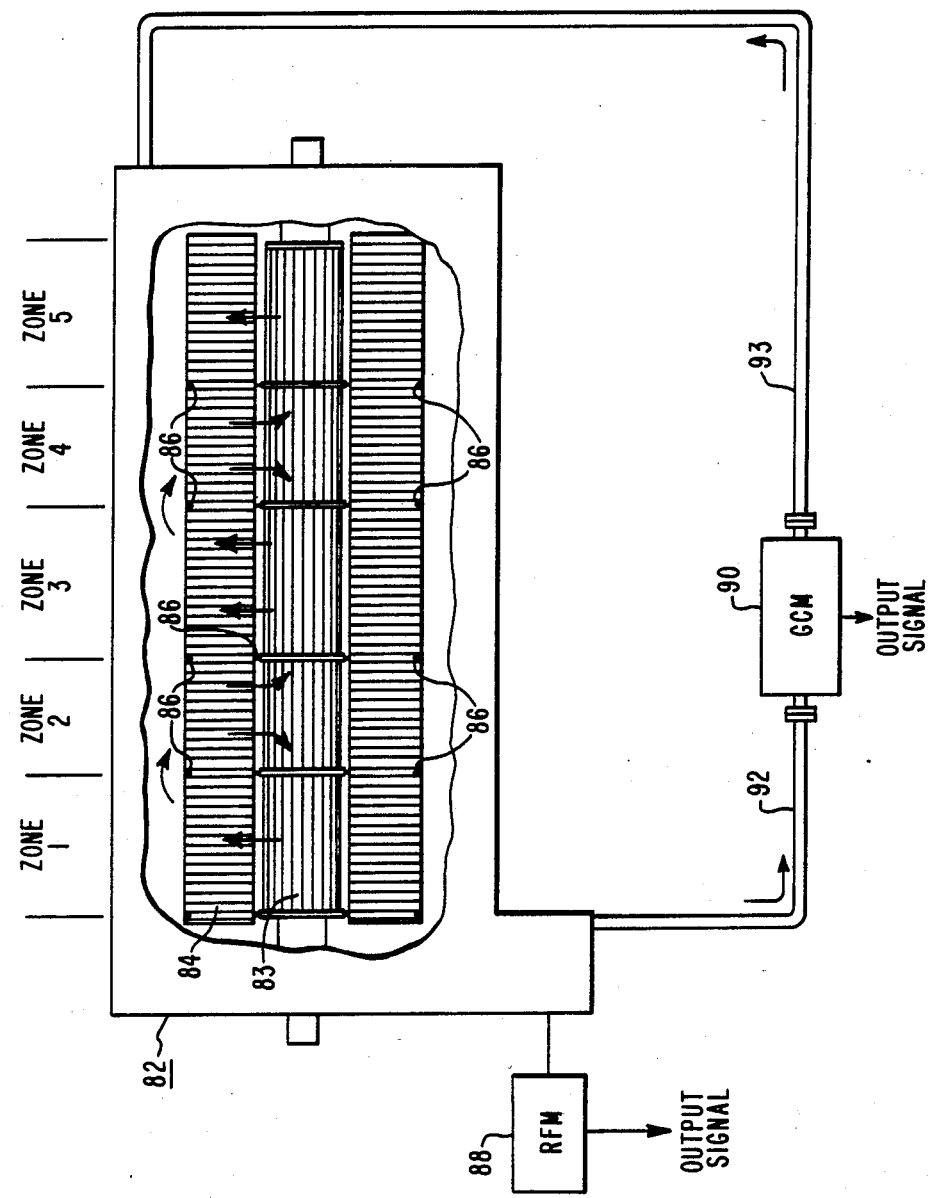

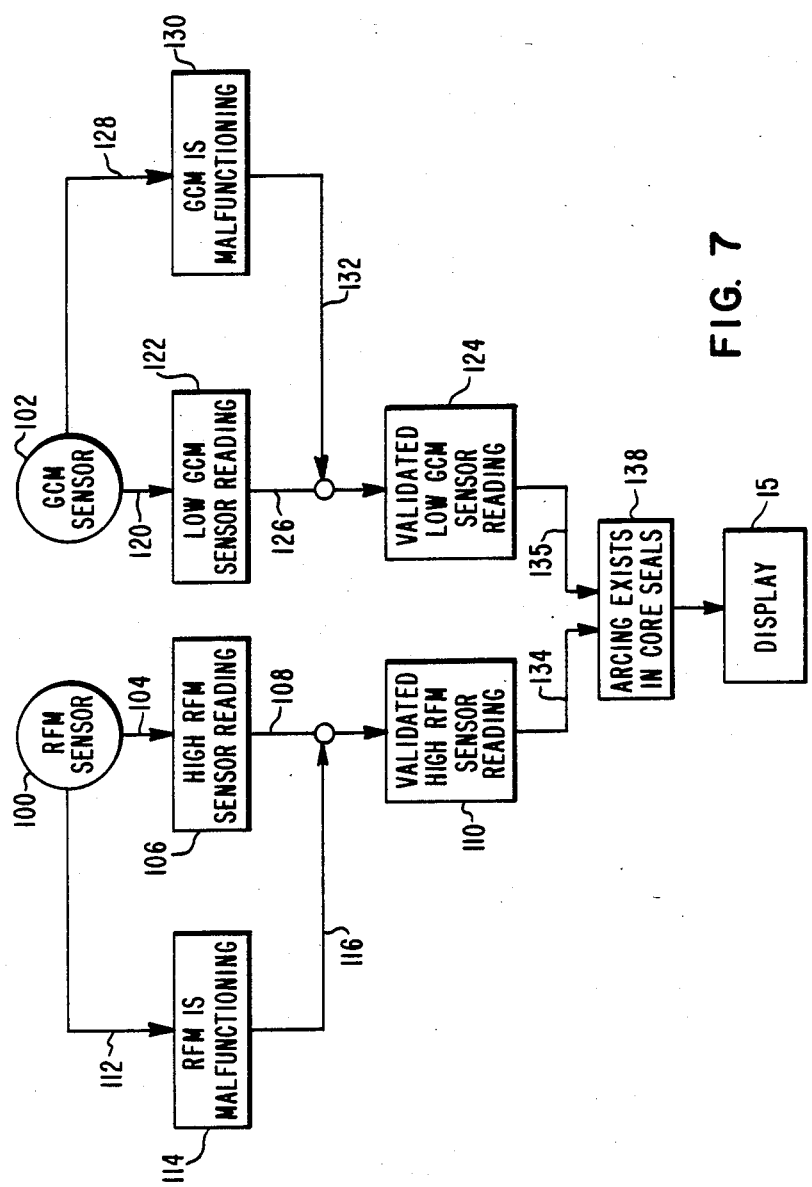

DIAGNOSTIC APPARATUS

BACKGROUND OF THE INVENTION

1. Field of the Invention

The invention in general relates to diagnostic apparatus, and particularly to a sensor-based system for on-line realtime monitoring.

2. Description of the Prior Art

Complex industrial or other operating systems generally have a plurality of sensors for monitoring various parameters during operation, not only for control purposes but for purposes of monitoring the system to detect actual or impending malfunctions.

Some systems may utilize dozens, if not hundreds, of sensors in the diagnostic process and very often the sensors may fail, degrade, or provide spurious readings not related to the actual parameter being measured.

Use of erroneous sensor data in the diagnostic process can lead to erroneous conclusions about possible malfunctions. In one respect, a malfunction may be indicated where, in fact, no malfunction exists and conversely a malfunction may be occurring or may occur without its detection and without proper notification to the system operator. Such event can represent a tremendous economic loss as well as a potentially dangerous situation.

To obviate these potential problems, some systems utilize redundant sensors such that if one fails another may take its place. For systems utilizing hundreds of sensors, such solution may be unfeasible, from an economic standpoint. In other types of systems, sensor readings are preprocessed prior to the system diagnosis and eliminated from consideration if their readings exceed certain boundaries. With such an arrangement, however, valuable information relative to the sensor degradation history which may be utilized in the diagnostic process, is lost.

The present invention provides for a diagnostic system which can recognize operating problems while they may be little more than a vague trend, and may do so taking into account sensor degradation or failure.

SUMMARY OF THE INVENTION

Diagnostic apparatus is provided for monitoring an operating system having a plurality of sensors throughout the system and which generate output signals indicative of certain system parameters. A control establishes a first subsystem for each of a number of selected sensors and includes means to periodically obtain readings of the sensor output signals to provide a plurality of indications characterizing movement, if any, of the sensor signal. Such movement indication may include whether or not a sensor signal has sharply increased or decreased in a first period of time, whether it has slowly increased or decreased in a second and greater period of time or whether or not the signal is steady during the time periods.

The control is additionally operable to establish a second subsystem which is responsive to the sensor readings as well as selected ones of the movement indications to provide validated conclusions relative to the sensor signal with each conclusion having a certain confidence factor in the validity of the conclusion.

The control also establishes a third subsystem which is responsive to the sensor signals as well as the validated conclusions obtained by the second subsystem to provide indications of possible malfunctions in the operating system whereby such malfunctions, with a certain degree of confidence, may be communicated to an operator.

An example of diagnostic apparatus in accordance with the present invention is illustrated with respect to a steam turbine-generator power plant which utilizes a plurality of sensors for obtaining data relative to chemical parameters at the influent and effluent of chemically active components to predict possible malfunctions of these components.

DESCRIPTION OF THE PREFERRED EMBODIMENT

Figure 1:
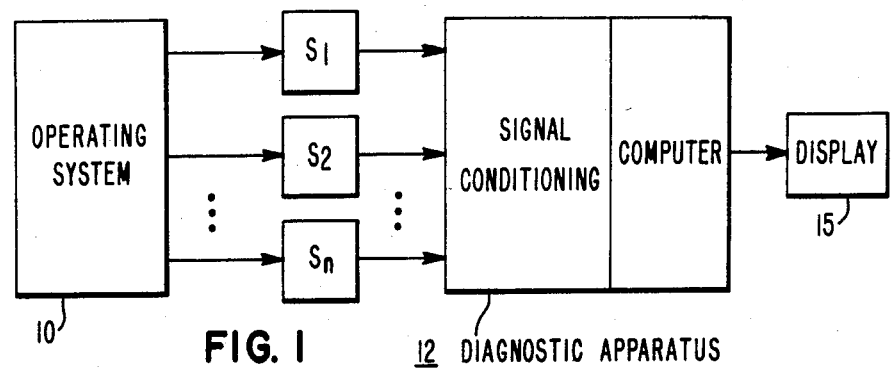
FIG. 1 illustrates a simplified diagram of a steam turbine generator power plant.

Although the present invention is applicable to a variety of operating systems, it will be described in this preferred embodiment with respect to a steam turbine generator power plant such as illustrated in FIG. 1.

The plant includes a steam turbine arrangement 10 having a plurality of turbines in the form of a high-pressure turbine 12, intermediate pressure turbine 14 and low pressure turbine 16, all of which are coupled to a common shaft 18 to drive an electrical generator 20 which supplies power to a load 22 when on-line with main circuit breakers 23 closed.

A steam supply such as a fossil-fired once-through boiler system 24 includes, by way of example, and input economizer section 26, a superheater 27 and a reheater 28. Boiler steam is provided to the turbine arrangement 10 through input valving 30 and steam exiting the high-pressure turbine 12 is reheated in reheater 28 and provided to intermediate pressure turbine 14 through valving 32. Steam exiting the intermediate pressure turbine 14 is provided by way of cross-over piping 34 to the low-pressure turbine 16 from which the steam is exhausted into a conventional condenser 36 in heat exchange relationship with externally supplied cooling water.

Water in the condenser is recirculated back to the boiler after chemical treatment to maintain high purity.

The chemical treatment may include a plurality of condensate polishers 40 which basically are ion exchange units designed to remove certain impurities. After the chemical treatment, the water is heated by a series of heaters 42 including a deaerating heater which removes dissolved gases, and, after addition of certain chemicals, is returned to the input economizer 26 of the boiler system 24.

The power plant is provided with a plurality of sensors including sensors to monitor chemical parameters of the steam in the turbine system as well as condensate in the path between the condenser and boiler system. Accordingly, sensor array 50 is provided and includes a plurality of sensors S1, S2 . . . Sn which receive sample steam from the steam path and reduced to suitable pressure and temperature by conditioner 52. Similarly, a plurality of other sensor arrays 54 to 56 are respectively provided at the output of condenser 36, after the polishers 40 and prior to economizer 26. By way of example, the sensors of each array may include those for measuring acid cation exchanged conductivity, sodium concentration, dissolved oxygen, specific conductivity, pH and chloride concentration.

The sensor arrays are positioned at the influent and effluent of chemically active components of the steam turbine system. For example, sensor array 50 in the steam path measures the influent to condenser 36 while sensor array 54 measures the effluent. Sensor array 54 in turn provides data relative to the influent to condensate polishers 40 while sensor array 55 measures the effluent therefrom. Data relative to the influent and effluent of chemical feeds, and heaters 42 are provided by respective sensor arrays 55 and 56 while sensor arrays 56 and 50 provide information relative to the influent and effluent of boiler system 24. Thus, the sensors can provide not only indications of corrosive and other impurities in the system but are strategically located to provide indications of plant component malfunctions as well.

The malfunction assessments are provided by a digital computer 58 controlling the diagnostic process so as to provide possible malfunction indications which may be communicated to an operator via an output 60 such as an alarm system, CRT or other display, message system or combinations thereof.

Figure 2:
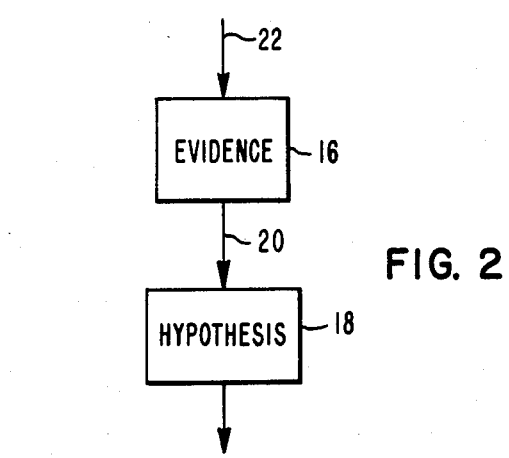
FIGS. 2 and 3 illustrate nodal diagrams utilized to explain one type of expert system which may be utilized in the operation of the diagnostic apparatus.

In a preferred embodiment, the computer controls the diagnostic process by implementation of an expert system computer program that uses knowledge representations and inference procedures to reach conclusions normally determined by a human expert. A common form of knowledge representation is in the form of IF . . . THEN rules and one such system which may be utilized in the practice of the present invention is PDS (Process Diagnosis System) described in the Proceedings of the Eighth International Joint Conference on Artificial Intelligence, Aug. 8-12 1983, pages 158-163. Basically, in that system (as well as other expert systems) for each rule there is an antecedent or evidence (the IF portion) as well as a consequent or hypothesis (the THEN portion) which can become evidence for other rules. As depicted in FIG. 2, evidence 64 is linked to the consequent hypothesis 65 by means of rule 66, with the evidence and hypothesis constituting nodes of the system. Numeral 68 represents a supporting rule of node 64, that is, a rule for which the node 64 is a hypothesis. Rule 66 is a supported rule of node 64, that is, a rule for which the node 64 is evidence. Likewise, rule 66 is a supporting rule for node 65. In the system, by way of example, nodes can take the form of evidence, hypothesis, malfunctions, sensors and storage-nodes which are nodes capable of storing values input from other nodes and performing some predetermined mathematical operation on the values.

Associated with each node is a measure of belief, MB, that the node (hypothesis) is true, as well as a measure of disbelief, MD, which is a measure of belief that the hypothesis is not true. Both factors range on a scale from 0 to 1 and the difference between them, MB-MD, yields a certainty or confidence factor CF which ranges from $-1$ to $+1$, where positive numbers represent confidence that the hypothesis is true and negative numbers represent belief that the hypothesis is not true; numbers in the vicinity of 0 represent uncertainty.

An expert (or experts) in the field to which the diagnosis pertains establishes the various rules and relationships which are stored in the computer's memory and utilized in the diagnostic process. The expert's belief in the sufficiency of the rule is also utilized. This belief, which represents the experts opinion as to how the presence of evidence proves the hypothesis, is given a numerical representation designated as a sufficiency factor, SF, which ranges from $-1$ to $+1$, where positive values of SF denote that the presence of the evidence suggests that the hypothesis is true and negative values denote that the presence of the evidence suggests that the hypothesis is not true.

PDS additionally utilizes the expert's belief in the necessity of the rule, which illustrates to what degree the presence of the evidence is necessary for the hypothesis to be true. This necessity belief is given a numeral representation designated as a necessity factor NF which ranges from $-1$ to $+1$ where positive values of NF denote that the absence of evidence suggests that the hypothesis is not true and negative values denote that the absense of the evidence suggests that the hypothesis is true.

Figure 3:
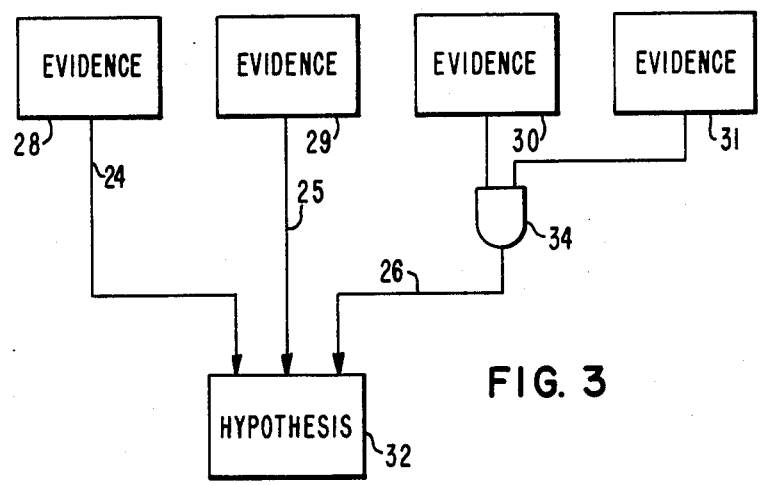

FIG. 3 illustrates another common arrangement wherein a plurality of rules 68 to 70 connect evidence nodes 72 to 75 to a hypothesis node 76. Element 78 represents the combining of evidence in (a) a disjunctive manner, that is, if evidence 74 OR 75 is present, or (b) in a conjunctive manner, that is, if evidence 74 AND 75 are present.

Belief leading to a consequent possible malfunction in the system being diagnosed is propagated from evidence to hypothesis in repetitive cycles, at the beginning of which the CF, MB and MD values of each node are reset to zero (except for a sensor node where the MB and accordingly the CF is assumed to be $+1$).

If the CF of the evidence is positive, then the rule's sufficiency is utilized to propagate belief, whereas if the CF of the evidence is negative, the rule's necessity is utilized; if CF is zero, nothing is done.

Basically, if the evidence CF is positive and the SF is positive, then the MB of the hypothesis is increased; if the SF is negative, then the MD of the hypothesis is increased.

Conversely, if the evidence CF is negative, and the NF positive, then the MD of the hypothesis is increased, and if the NF is negative, the MB of the hypothesis is increased. By way of example, for the single rule case of FIG. 2, if MB and MD are the belief and disbelief in the rule's hypothesis, CF the confidence in the rule's evidence, and SF and NF are the rule's sufficiency and necessity, then:

$$\text{if } CF > 0 \text{ and } SF > 0: MB = CF \times SF \quad (1)$$

$$\text{if } CF>0 \text{ and } SF<0 : MD = CF \times (-SF) \quad (2)$$

$$\text{if } CF<0 \text{ and } NF>0 : MD = (-CF) \times NF \quad (3)$$

$$\text{if } CF<0 \text{ and } NF<0 : MB = CF \times NF \quad (4)$$

For the multiple rule case of FIG. 3, final values are obtained by examining each rule in sequence and performing the calculations for each rule in accordance with the following, where $MB_{old}$ and $MD_{old}$ are the belief and disbelief in the rule's hypothesis before each calculation, CF the confidence in the rule's evidence, SF and NF are the rule's sufficiency and necessity and $MB_{new}$ and $MD_{new}$ are the belief and disbelief in the rule's hypothesis after each calculation:

$$\text{if } CF>0 \text{ and}$$
$$SF>0 : MB_{new} = MB_{old} + (1-MB_{old}) \times CF \times SF \quad (5)$$

$$\text{if } CF>0 \text{ and}$$
$$SF<0 : MD_{new} = MD_{old} + (1-MD_{old}) \times CF \times (-SF) \quad (6)$$

$$\text{if } CF<0 \text{ and}$$
$$NF>0 : MD_{new} = MD_{old} + (1-MD_{old}) \times (-CF) \times NF \quad (7)$$

$$\text{if } CF<0 \text{ and } NF<0 :$$
$$MB_{new} = MB_{old} + (1-MB_{old}) \times CF \times NF \quad (8)$$

For a disjunctive logical node (OR function) then the highest confidence factor of all of the pieces of evidence may be utilized, whereas if the logical node is conjunctive (AND function) the minimum of all of the confidence factors may be utilized. Alternatively, a weighted average may be utilized.

Thus, by utilizing the appropriate previous equations, a measure of belief and/or disbelief is calculated for a hypothesis and from these values a confidence factor in the hypothesis is calculated from the relationship $CF = MB - MD$.

Figure 4A:
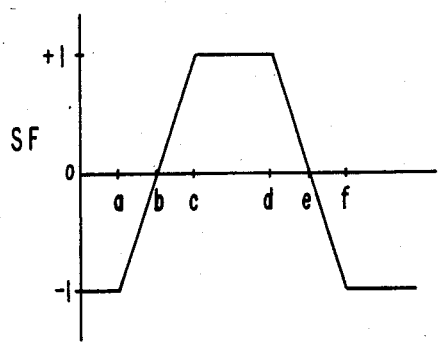
FIGS. 4A and 4B illustrate various functions associated with components of FIGS. 2 and 3.
Figure 4B:
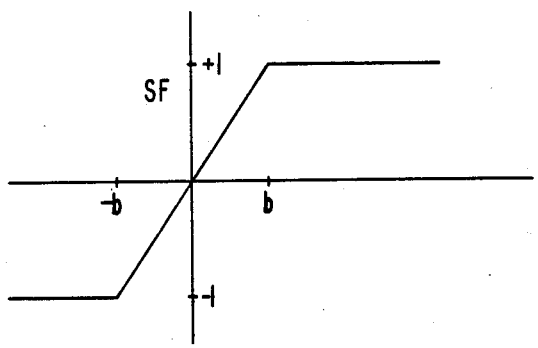
Figure 5A:
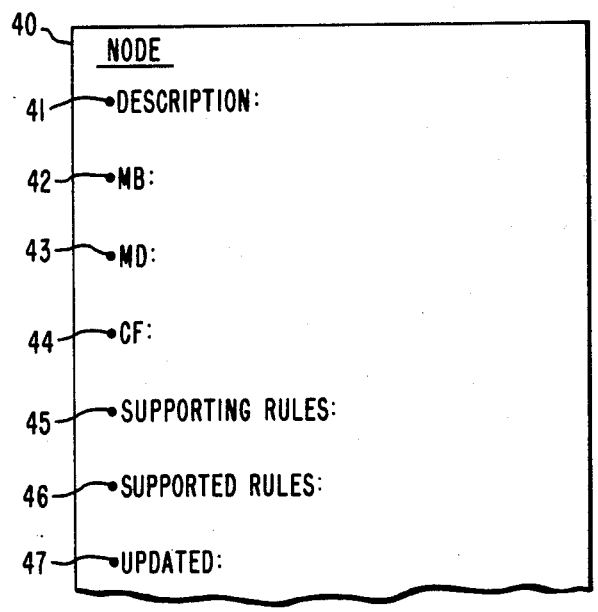
FIG. 5 is a nodal diagram subsystem illustrating the propagation of belief relative to certain parameters of any sensor utilized in the arrangement of FIG. 1.
Figure 5B:
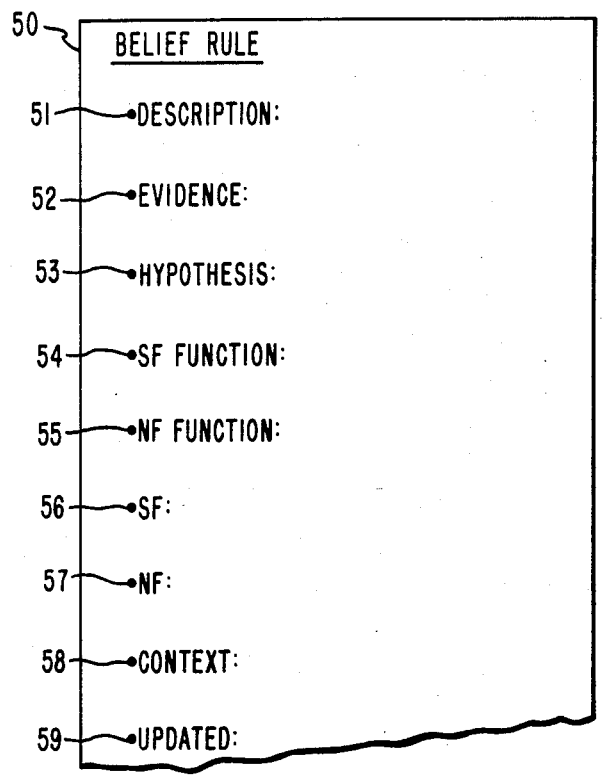
Figure 5C:
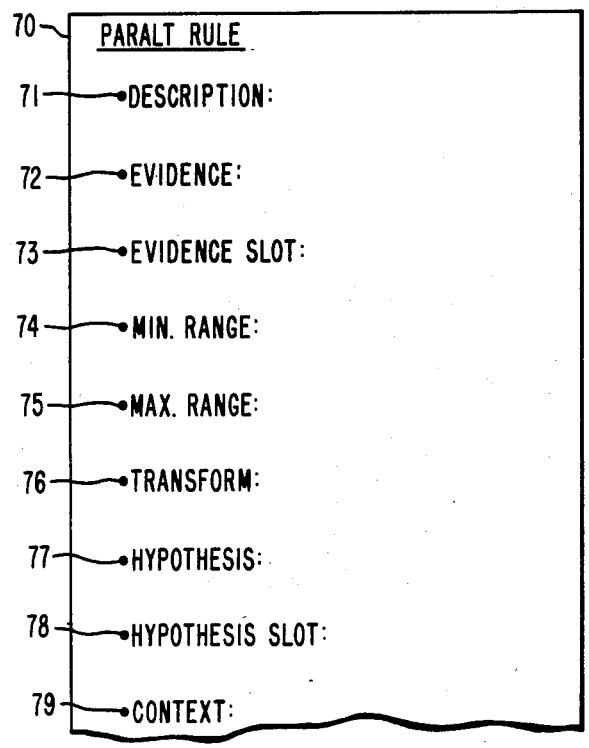
Figure 8A:
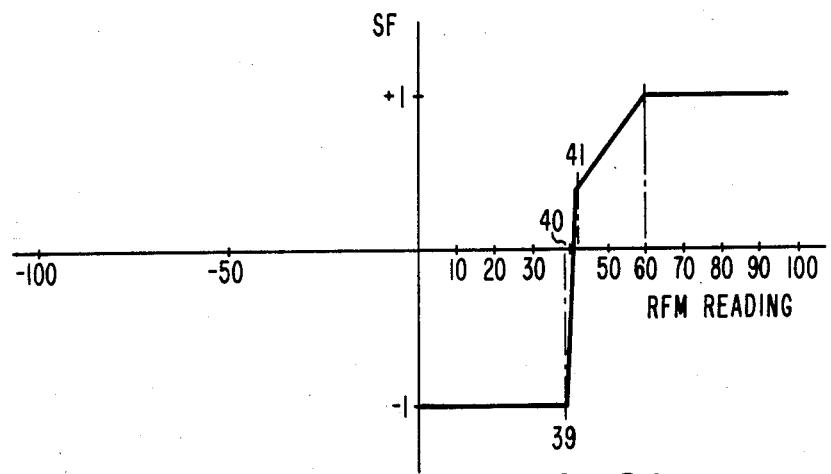
FIG. 8 is a nodal diagram subsystem illustrating the propagation of belief of certain characteristics relative to another particular sensor of the arrangement of FIG. 1.
Figure 8B:
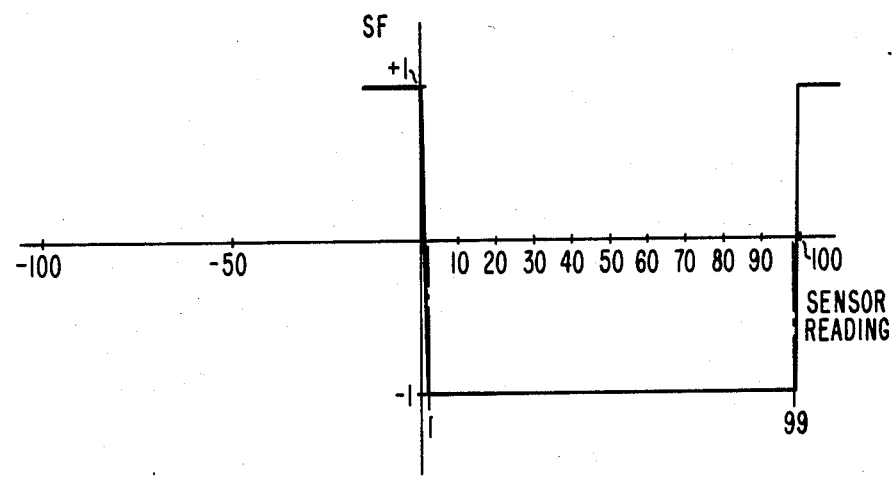
Figure 8C:
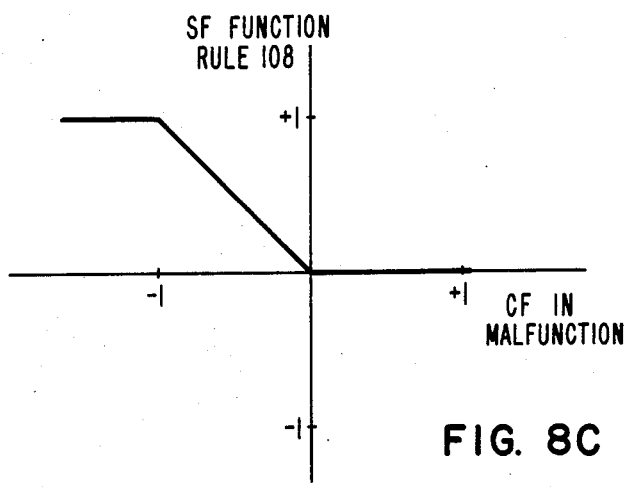
Figure 8D:
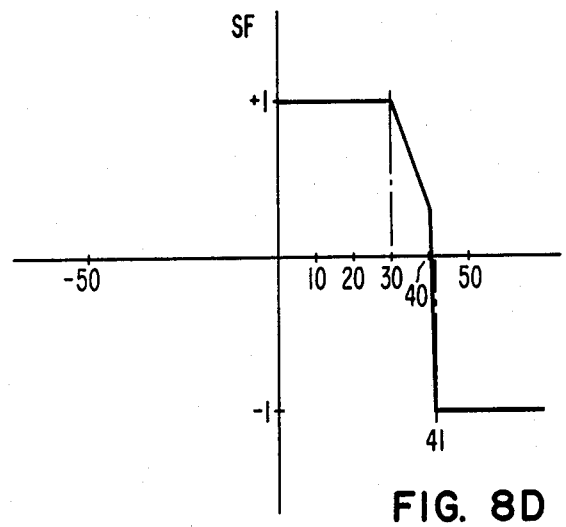

A rule's sufficiency (SF) or necessity (NF) may in many instances by expressed as a constant. In other instances, the sufficiency and/or necessity may be expressed as some other function which will generate a sufficiency or necessity factor of a fixed number by evaluating the function for a particular variable. A common function which may be utilized is a piece-wise linear function, two examples of which are illustrated in FIGS. 4A and 4B. The Y-axis in these figures represent the SF (or NF) ranging from $-1$ to $+1$ on the vertical scale. The X-axis horizontal scale represents the value of some variable such as a sensor reading or the result of some mathematical operation, by way of example. In FIG. 4A, if the variable has a value between 0 and a, or is greater than f, it will generate an SF of $-1$ whereas if the value is between c and d, it will generate an SF of $+1$. Values between a and c or d and f will generate corresponding SFs between $-1$ and $+1$. FIG. 4B represents a piece-wise linear function wherein any variable value greater than b will generate an SF of $+1$, any variable value less than $-b$ will generate an SF of $-1$ and values between $-b$ and $+b$ will generate a corresponding SF between $-1$ and $+1$.

Another type of useful rule is a reading-transform rule which, when carried out, applies a transform function to the value found in the rule's evidence node. If the evidence node is a sensor, the value is a sensor reading, with appropriate conversion, scaling, etc. performed by the transform, if needed.

Figure 5:
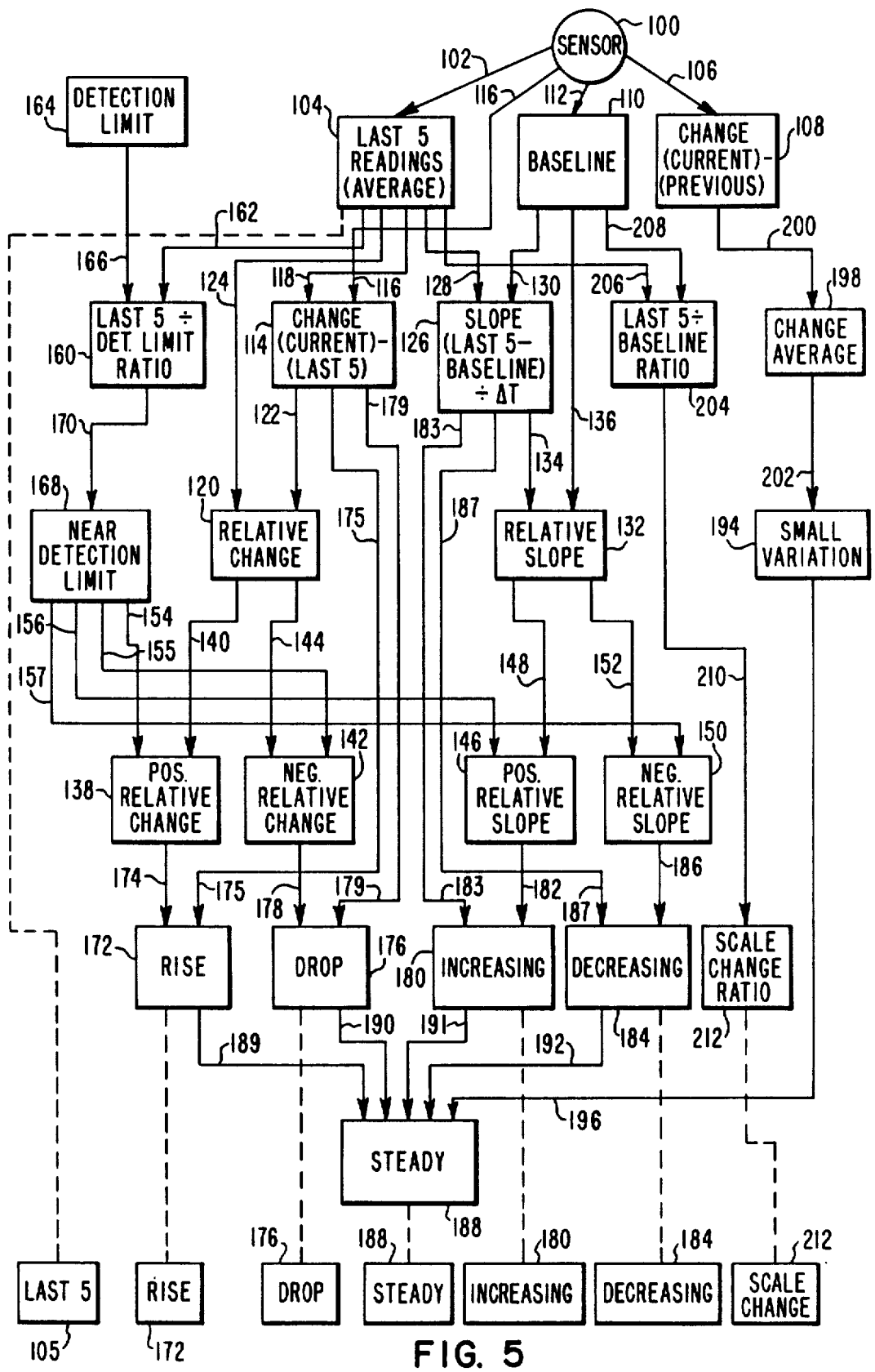

In FIG. 1, the various types of sensors utilized to gather data are themselves subject to erroneous operation and therefore may lead to an erroneous diagnosis of plant components. In accordance with the present invention, the computer controlling the diagnosis operation establishes a first subsystem which is generic to all sensors and which may be instantiated, or applied, with respect to selected sensors throughout the system. A typical generic subsystem utilizing the expert system nodal and rule concept is illustrated in FIG. 5. The arrangement is responsive to the sensor output signals to provide an indication of sensor signal movement. In FIG. 5 and subsequent Figs. an item designated as a sensor is a node into which actual sensor readings are placed.

Sensor 100 periodically provides sensor readings which are linked by a reading transform rule 102 to node 104 which is operable to obtain an average of the last five sensor readings so as to provide some stability and filter out any sensor noise. At the other extreme, reading transform rule 106 links the sensor readings to node 108 which is operable to obtain the value of the current sensor reading minus the previous sensor reading so as to be sensitive to sensor variation and provide an indication of just how much noise is present in the system.

Baseline function 110, linked to the sensor by reading transform rule 112 is operable to provide a relatively longer term indication of sensor performance. Let it be assumed, merely by way of example, that sensor readings are periodically provided once a minute. Baseline function 110 may be operable to accumulate readings over a period of time such as 30 minutes and provide the average of, for example, the first 10 readings of the 30 minute period.

Accordingly, function 108 provides indications of changes from minute to minute, function 104 provides a 5 minute average and baseline function provides an average over an interval in past time.

The last 5 and baseline functions are utilized to obtain various indications of short term or long term sensor performance. Node 114 determines the change, if any, between the current sensor reading provided by rule 116 and the average of the last 5 provided by rule 118. The amount of change relative to the average is determined at node 120 which functions to divide the value of change by the average of the last five readings. To accomplish this, the relative change node 120 is linked by rule 122 to node 114 and by rule 124 to node 104.

Trending information, or slope, is obtained by node 126 which is linked to the last five average node 104 by rule 128 and to baseline node 110 by rule 130. Functionally, the slope is obtained by subtracting the baseline value from the last five average and dividing by the time period between the centers of the data group. That is, the time period between the center of the ten readings taken 30 to 20 minutes ago and the center of the last five readings is 22.5 time units or 22½ minutes in the present example.

In addition to the slope, the relative slope is obtained at node 132 by dividing the slope, linked by rule 134, by the baseline, linked by rule 136.

If the relative change, as determined at node 120, is positive, its belief is propagated to node 138 indicative of a positive relative change, with the propagation being via rule 140. Similarly, belief in a negative relative change is propagated to node 142 via rule 144.

In an analogous manner, belief in a positive relative slope at node 132 is propagated to node 146 via rule 148 and belief in a negative relative slope is propagated to nodeU 150 via rule 152.

Accordingly, nodes 138 and 142 set forth information with a certain degree of confidence with respect to relatively short term sensor changes. Nodes 146 and 150 set forth information with a certain degree of confidence with respect to relatively longer term changes in sensor readings. Confidence in these beliefs, however, will be lowered if the sensor readings are close to the detection limit of the sensor itself in which case, certain values may become unstable militating against drawing large conclusions based on these values.

In order to reduce the confidence factors associated with nodes 138, 142, 146 and 150, the subsystem includes means for adding disbelief to these nodes via rules 154 to 157 should be sensor be operating near its detection limit. Node 160 determines the ratio of the average sensor reading compared to the detection limit, with the average being propagated by rule 162 from node 104 and the detection limit being provided by a detection limit node 164 via rule 166. If the ratio calculated at node 160 is less than one, for example, belief is propagated to node 168 via rule 170 that the apparatus is in fact near the detection limit so as to modify belief in the short term and long term changes.

If, in fact, operation is not near detection limits and a positive relative change has occurred, then this is indicative of a short term rise in the sensor output as determined at node 172 linked to node 138 by rule 174. A positive change propagated from node 114 by rule 175 would also indicate this short term rise. If a negative relative change has occurred, then this is indicative of a short term drop as indicated at node 176 connected to node 142 by rule 178. A negative change propagated from node 114 by rule 179 would also indicate this short term drop.

If, over the long term, the relative slope is positive as indicated at node 146, then this condition is indicative of a slowly increasing sensor output as depicted at node 180 connected to node 146 by rule 182. A positive slope propagated from node 126 by rule 183 would also indicate this long term increase. Conversely, a negative relative slope gives rise to a decreasing sensor output indication at node 184 conencted to node 150 by rule 186. A negative slope propagated from node 126 by rule 187 would also indicate this long term decrease.

The short term nodes 172 and 176 and the long term nodes 180 and 184 are evidence for whether or not this sensor output is steady as defined by node 188 and connected to these previous nodes by respective rules 189 to 192. All of these latter rules would have negative sufficiency functions creating disbelief in the steady hypothesis, since, if the sensor output is rising or dropping or increasing or decreasing, it is not steady.

A positive belief in a steady situation may be propagated from node 194 connected to steady node 188 by rule 196 and indicative of a small variation. That is, if the sensor output signal does not change from reading to reading, or changes by a very small predetermined amount, then this situation is indicative of a steady condition. In order to determine this variation, the change from reading to reading as developed at node 108 is propagated via rule 200, which takes the absolute value of the change, and node 198 derives the value for average change. A piece-wise linear function associated with rule 202 would then propagate belief or disbelief to node 194 depending upon the value of the average change.

Many sensors can operate over a wide dynamic range and accordingly include scale changing facilities. If identical sensors throughout the system have been set to the same scale and one sensor subsequently and inadvertently is switched to a different scale, then its output contribution would be misleading. Accordingly, the subsystem of FIG. 5 includes means for determining whether or not a scale change has been made. This is accomplished with the provision of node 204 which determines the ratio of the average of the last five readings from node 104 via rule 206 to the baseline value from node 110 via rule 208. Depending upon the value derived at node 204, a piece-wise linear function associated with rule 210 would propagate the belief that there has or has not been a scale change. By way of example, suppose that the sensor instrument includes means for changing the scale by factors of ten. The piece-wise linear function associated with rule 210 therefore would be +1 for an average to baseline ratio of around 0.1, 1, 10, 100, etc., and −1 for other ratios.

Accordingly, the subsystem of FIG. 5 derives a great deal of information relative to the operation of any sensor to which the subsystem is applied and this information, reproduced at the bottom of FIG. 5, is utilized in subsequent subsystems established by the computer control.

Figure 6:
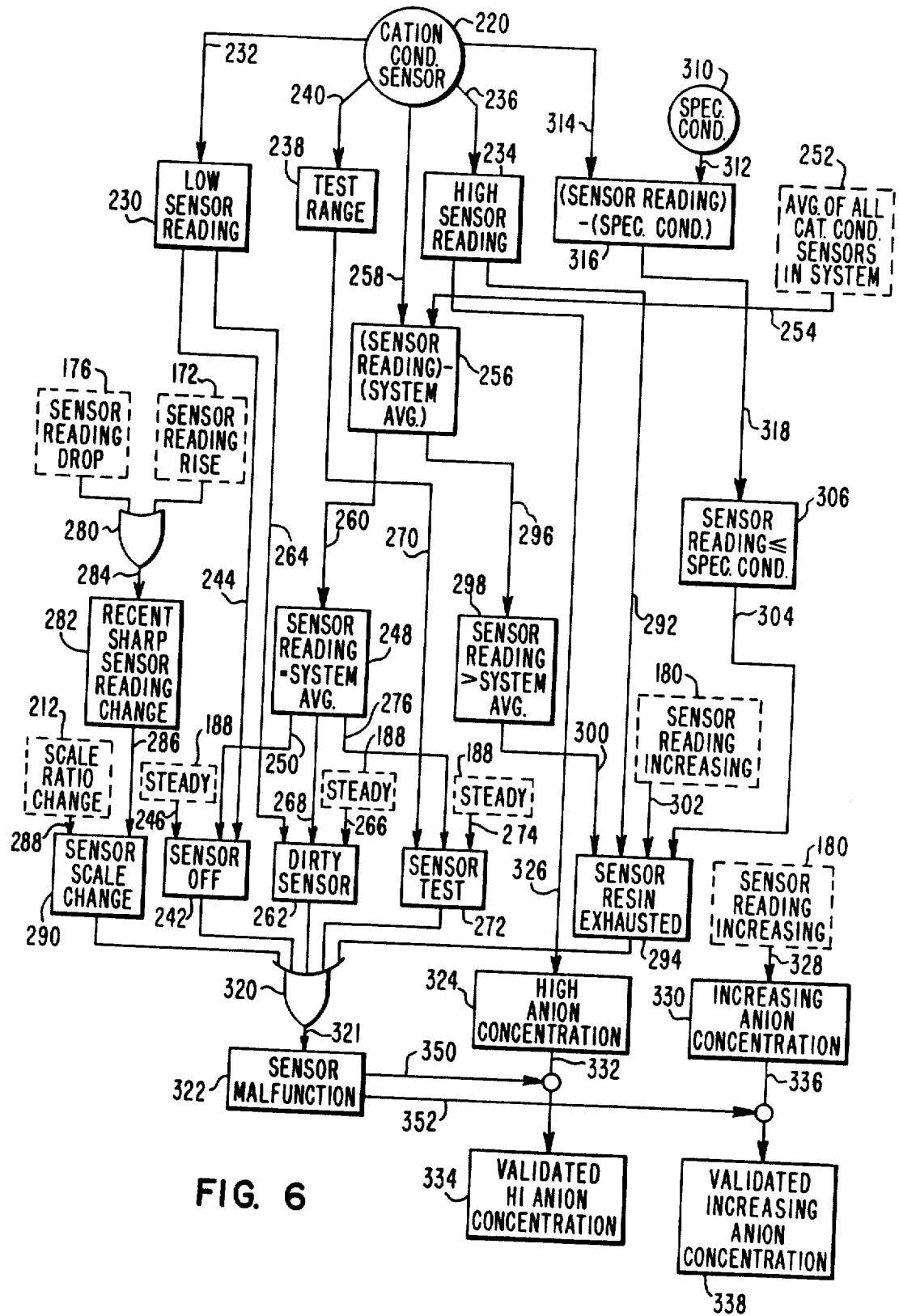
FIG. 6 is a nodal diagram subsystem illustrating the propagation of belief of certain characteristics relative to a particular sensor of the arrangement of FIG. 1.

One such subsystem is illustrated in FIG. 6 which pertains, by way of example, to the obtaining of validated readings from a cation conductivity sensor. The subsystem of FIG. 6 is generic to any cation conductivity sensor which may be utilized in the arrangement of FIG. 1 be it for steam measurement or condensate measurement.

Figure 7:
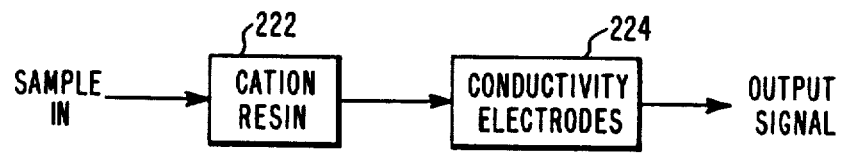
FIG. 7 is a simplified diagram of the type of sensor used in FIG. 6.

Very basically, a cation conductivity sensor, more particularly, an acid cation exchanged conductivity sensor, is utilized to exchange cations in a sample to hydrogen so that anions, commonly associated with corrosion, can be measured. FIG. 7 illustrates a simplified cation conductivity sensor. The sensor includes a cation resin bed 222 which removes the cations present in the sample and replaces them with hydrogen ions. Thus, any sodium chloride present in the sample is converted to hydrochloric acid, sodium sulfate is converted to sulfuric acid, sodium acetate is converted to acetic acid, etc. A conductivity cell 224 then provides an output signal proportional to the conductivity of the cation exchanged sample to provide an indication of anion concentration.

Returning once again to FIG. 6, the subsystem includes several nodes for characterizing the sensor output signal. A determination of whether or not the sensor reading is low is made at node 230 connected to the sensor by rule 232 and the determination of whether or not the sensor reading is high is accomplished at node 234 connected to the sensor by rule 236. Most sensors have provisions for testing the sensor electronics and under such test condition, any output signal provided is in an abnormally high range. Node 238 tests to see whether or not the sensor is in this abnormally high range and is connected to the sensor by rule 240.

If the sensor reading is low, it may be an indication that someone has turned the sensor off (many sensors will still provide a small output when turned off). Belief in the sensor being off may be generated at node 242 linked to node 230 by rule 244. If, however, the sensor reading is not steady, it means that the output readings are changing which strongly suggests that the sensor would not be in an off condition. Node 188 linked to the sensor off node 242 by rule 246 provides this indication of whether or not the sensor reading is steady. This indication is obtained from the steady indication of the subsystem of FIG. 5 as now applied to the specific cation conductivity sensor 220 of FIG. 6. In FIG. 6, as well as in subsequent Figs., nodes utilized from other subsystems are illustrated as dotted rectangles.

A further indication of the sensor being in an off condition is whether or not the sensor reading is equal to the system average as determined at node 248 linked by rule 250 to node 242. In order to make this determination, a node 252 provides an indication of the average readings of all cation conductivity sensors in the system of FIG. 1 and links it by rule 254 to node 256 which is linked to this one particular sensor's output by rule 258 in order to derive an indication of the difference between this sensor's reading and the system average. The result is linked to node 248 by rule 260 which would have a positive sufficiency factor if the results of the subtraction process of node 256 were within a predetermined range of zero.

Another factor which may yield a low sensor reading would be a contaminated or dirty sensor. For example, due to the operating environment, the conductivity electrodes may get contaminated such as by oil which then acts as an insulator resulting in an output reading which is not as high as it should be. This may be determined by the dirty sensor node 262 linked to the low sensor reading node 230 by rule 264. A steady indication linked by rule 266 from node 188 may add to the confirmation of a dirty sensor, however, if the reading is not steady, it does not mean that the sensor isn't dirty. Confidence may be lost in a dirty sensor diagnosis if the sensor reading is equal to the system average with the dirty sensor node 262 being linked to this prior node by rule 268.

Belief that the sensor is in the test range is propagated by rule 270 to node 272 which will confirm with a certain degree of confidence that the sensor is in a test mode taking into account whether or not the reading is steady and whether or not it equals the system average, these latter two factors being propagated by respective rules 274 and 276.

Three sensor conditions, off, dirty, and test, which would lead to decreased confidence in a valid sensor reading have been described. Other factors are also present including the determination of whether or not the sensor is on the correct scale. To make this determination, an OR function 280 is applied to nodes 172 and 176 indicative of a sensor reading rise or drop to determine whether or not there has been a recent sharp sensor reading change as determined at node 282 linked to the OR function by rule 284. With knowledge of a recent sharp sensor reading change propagated by rule 286 and belief as to whether or not a factor of 10 scale change is present propagated from node 212 by rule 288, node 290 may then make the appropriate scale change determination.

If the cation resin of the sensor illustrated in FIG. 7 is used up (exhausted) then ammonia, previously blocked by the resin will cause a relatively high output signal to be provided and which signal will be unrelated to acid cation conductivity measurement. Accordingly, rule 292 propagates the belief in a high sensor reading from node 234 to node 294 for the determination of resin exhaustion. To substantiate that the sensor reading is high, it is compared with the system average. This step was previously done at node 256 with the belief in a higher reading being propagated by rule 296 to node 298 establishing the belief that the sensor reading is in fact higher. This belief, propagated by rule 300 adds to the belief that the sensor resin is probably exhausted.

Two other factors may also lead to this conclusion, one being the fact that the sensor reading is increasing, propagated by node 180 via rule 302. The other input in the determination is via rule 304 from node 306 which establishes that the sensor reading is less than the specific conductivity of the sample. The specific conductivity value is provided by a specific conductivity sensor 310 included as one of the plurality of sensors in the sensor array. This specific conductivity value propagated by rule 312 and the cation conductivity sensor reading propagated by rule 314 are compared at node 316 wherein the specific conductivity value is subtracted from the sensor value with the result being propagated via rule 318 to node 306. If the resin is exhausted, then the value of the cation conductivity sensor output can get no higher than the specific conductivity sensor output. If there is evidence that the cation conductivity sensor value is not less than or equal to the specific conductivity value, then a measure of disbelief will be added to the determination of sensor resin exhaustion at node 294.

By way of example, five possible sensor malfunctions have been presented, namely, a scale change 290, sensor off 242, dirty sensor 262, sensor test 272 and sensor resin exhausted 294. Each malfunction has two or more inputs each lending a certain degree of concern relative to the existence of the malfunction such that the presence of the malfunction can be established with a certain confidence factor ranging from $-1$ (definitely not present) to $+1$ (definitely present).

The highest confidence in any of the possible malfunctions may be propagated by OR function 320 and rule 321 to node 322 indicative of a sensor malfunction. Since the sensor conclusions may be utilized in other subsystems to determine plant component malfunctions, the use of results from a failing or failed sensor would impact on accurate plant component malfunction predictions. For example, if there is a high sensor reading as determined at node 234, a logical conclusion is that there is a high anion concentration as specified at node 324 linked to the high sensor reading node 234 by rule 326. From an increasing reading determination made by the subsystem of FIG. 5, results propagated by rule 328 raises the belief in an increasing anion concentration specified by node 330.

Normally, in the absence of any sensor malfunction, confidence in a high anion concentration would be propagated unaltered by rule 332 to a validated high anion concentration node 334. Similarly, 100% of the confidence in an increasing anion concentration of node 330 would be propagated by rule 336 to a validated increasing anion concentration node 338. In the presence of a sensor malfunction, however, the confidence in these results must be reduced. One way of accomplishing this reduction in confidence is by a technique further described and claimed in copending application Ser. No. 061636,196, filed concurrently herewith, assigned to the same assignee as the present invention and hereby incorporated by reference.

Very basically, the change is accomplished by a paralt (parametric alteration) rule which is operable to change the sufficiency function and/or necessity function of another rule. If, in FIG. 6, node 322 indicates a sensor malfunction, paralt rule 350 will modify the sufficiency function of rule 332 to a degree depending upon the confidence in the sensor malfunction such that the confidence in the validated high anion concentration of node 334 is based on the sufficiency function of the modified rule. Similarly, paralt rule 352 will modify the sufficiency function of rule 336 so that confidence in a validated increasing anion concentration of node 338 is based upon the modified values of the rule. The necessity functions are changed in a similar manner.

Figure 8:
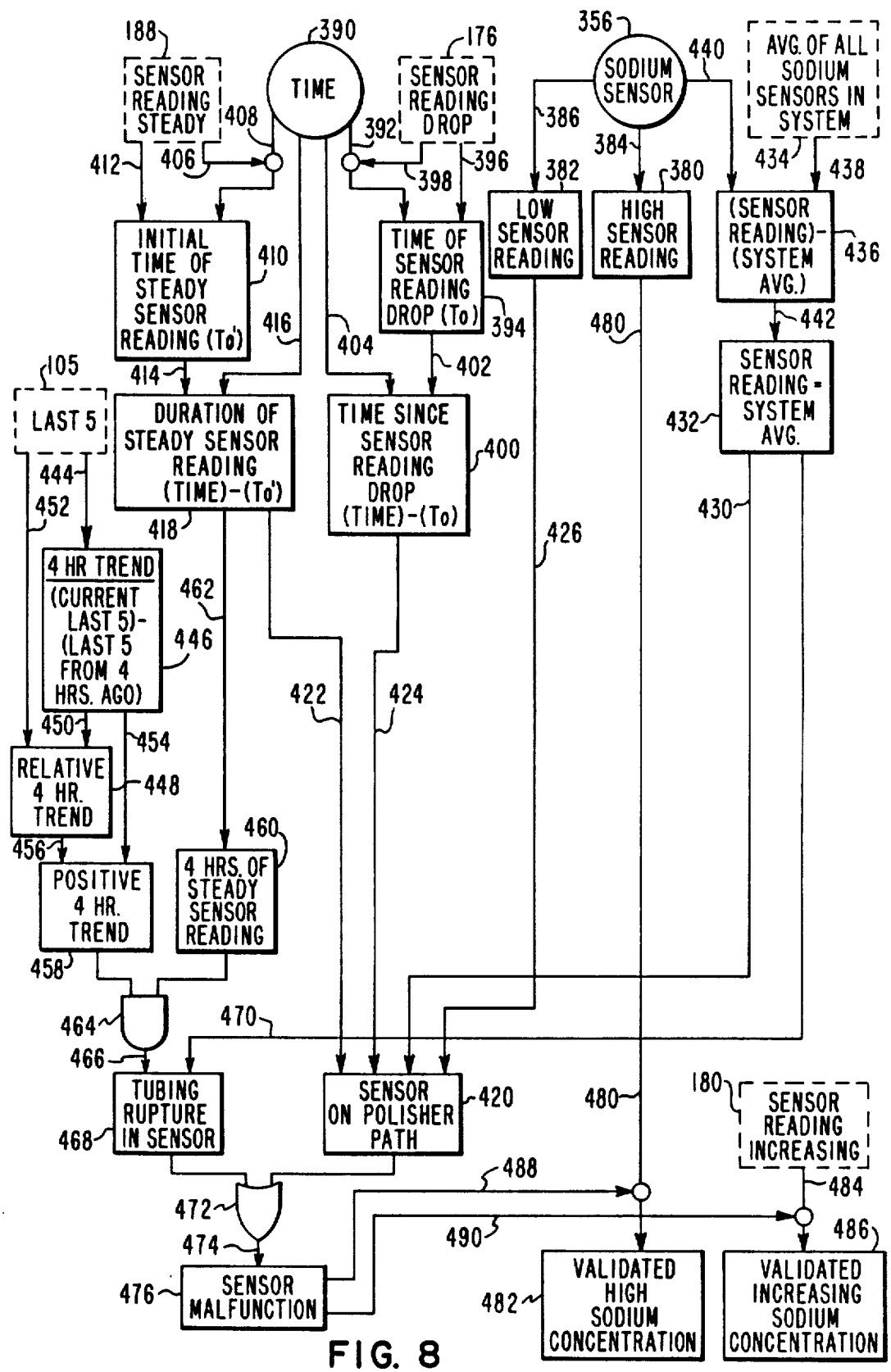
Figure 9:
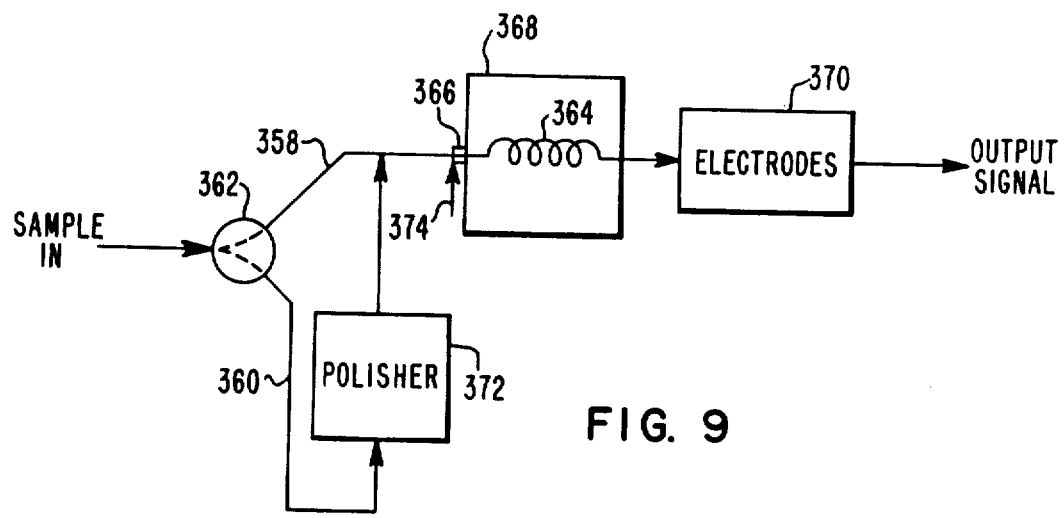

FIG. 8 illustrates a generic subsystem for validating the results of another type of sensor, namely a sodium sensor 356. The subsystem of FIG. 8 may be instantiated with respect to any sodium sensor or any array throughout the power plant be it connected to a steam line or a liquid line.

Figure 9:
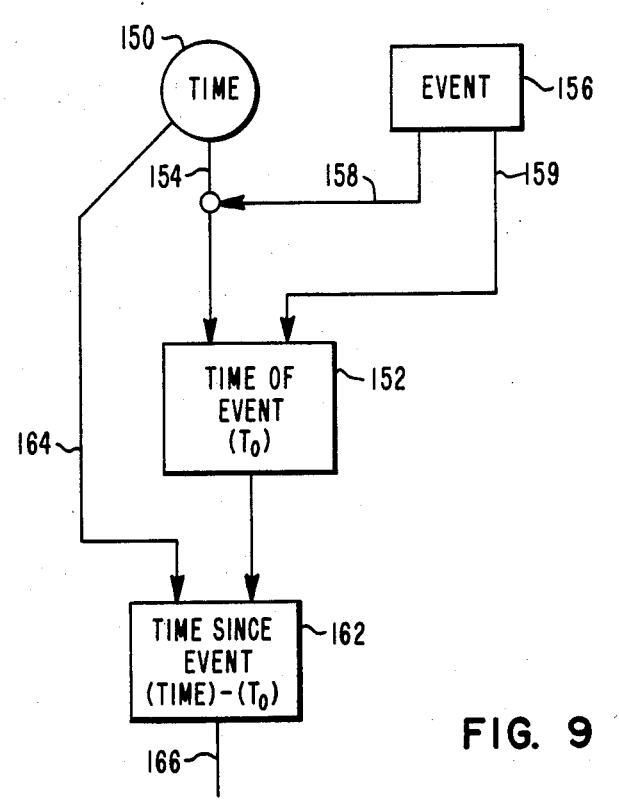
FIG. 9 is a simplified diagram of the type of sensor used in FIG. 8.
Figure 1:
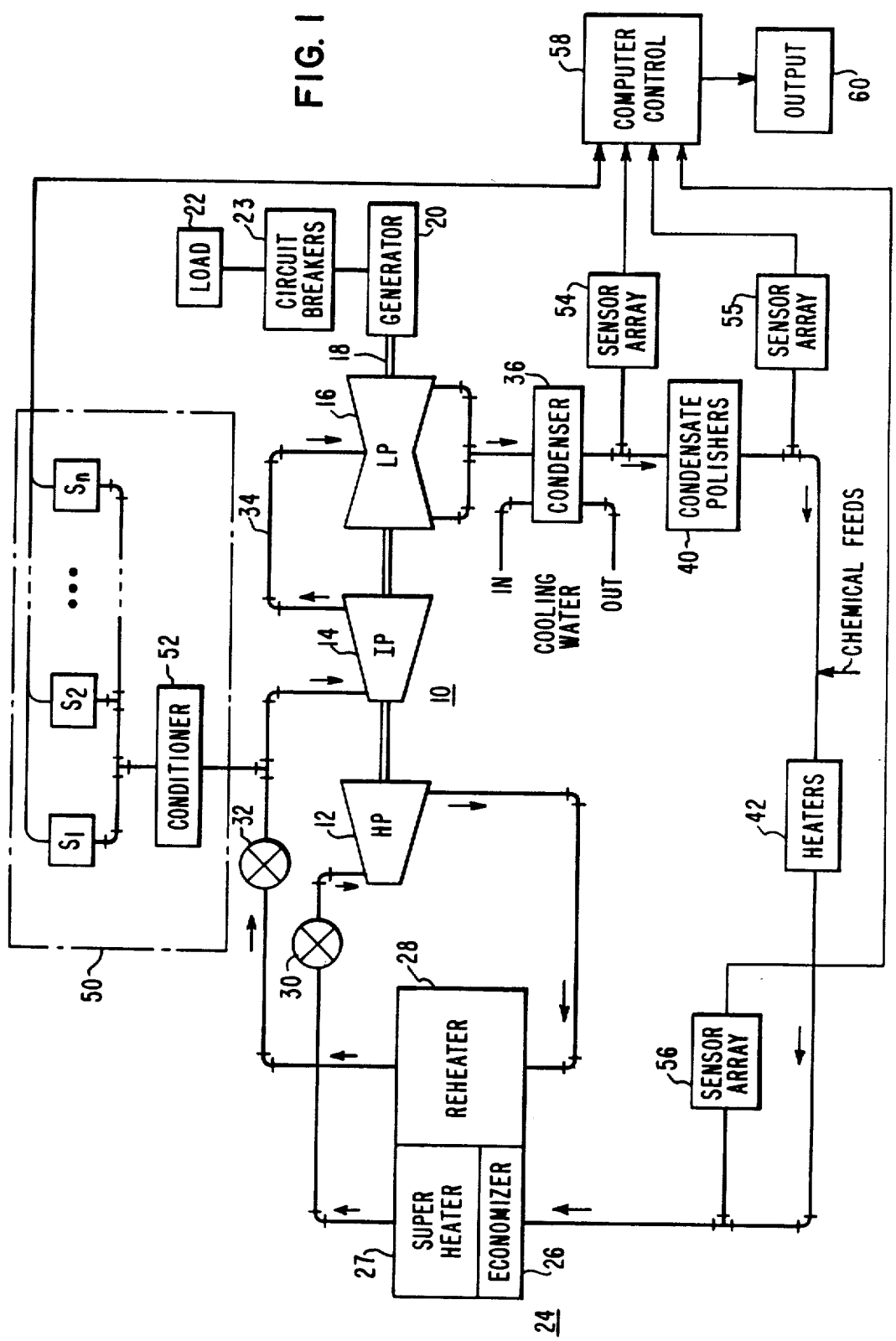
Figure 2:
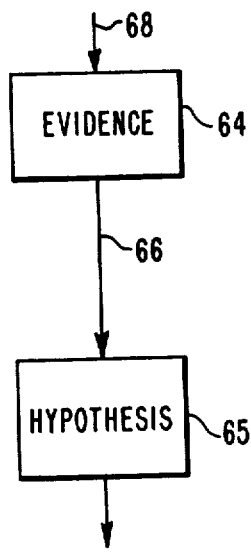
Figure 3:
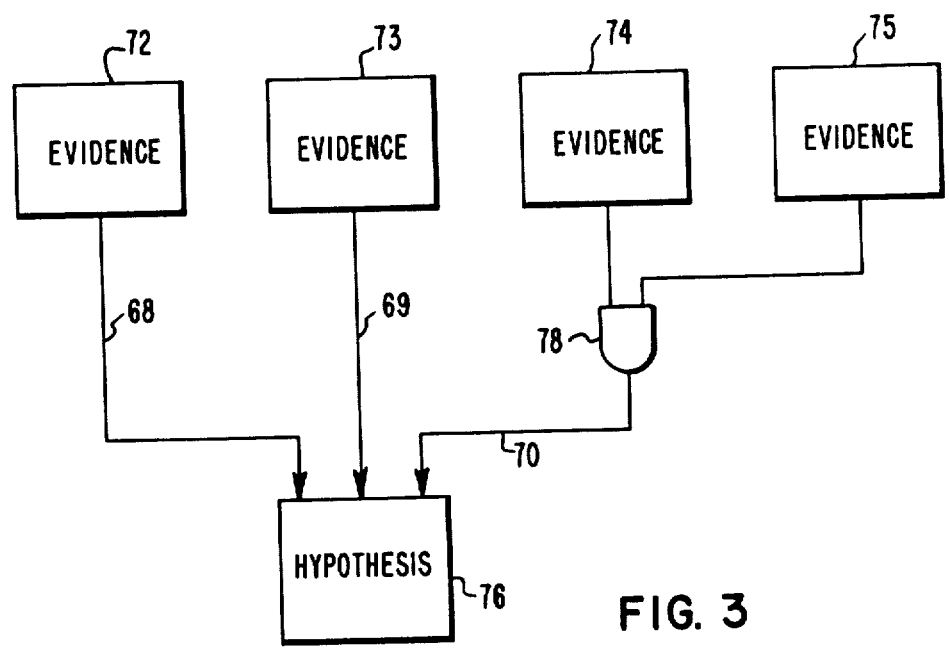
Figure 4A:
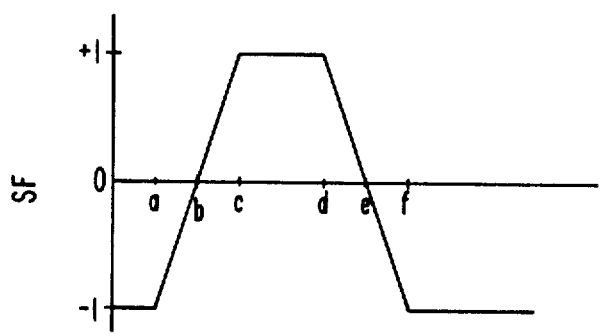
Figure 4B:
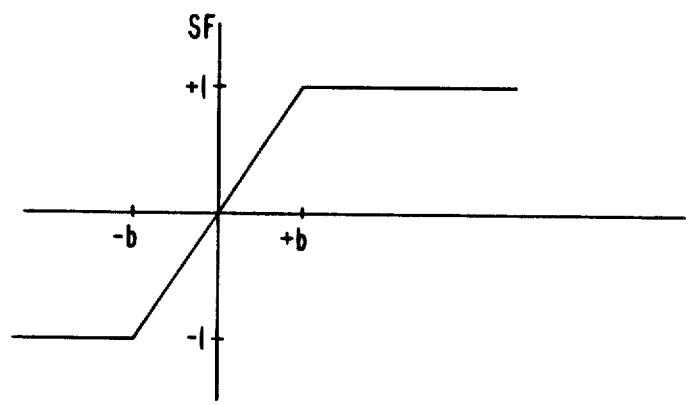

A simplified diagram of a typical commercially available sodium sensor is illustrated in FIG. 9. A sodium ladened input sample may be directed to a sensor path 358 or a polisher path 360 by means of a valve 362. When on the sensor path, the sample is directed through tubing 364 passing through an injection port 366. Tubing 364 is immersed in a concentrated ammonia environment 368 so that ammonia diffuses through tubing 364 at a predetermined rate to accurately control the pH value of the sample. The sample is then provided to a set of electrodes 370 including a sodium ion selective electrode and a reference electrode to derive an output signal, the value of which represents parts per billion of sodium concentration.

When valve 362 is operated to connect the input sample to the polisher path 360 for purposes of calibration, polisher 372 removes almost all traces of sodium in the fluid supplied to tubing 364 and the output signal would then reflect a lack of or an extremely low sodium concentration. Calibration is then accomplished by injecting, at port 366, a known concentration of sodium as represented by arrow 374.

Referring once again to FIG. 8, the subsystem obtains validated high and/or increasing sodium concentration indications as a function of the operating condition of the sensor.

High and low sensor reading indications in terms of sodium concentration (parts per billion) are obtained at respective nodes 380 and 382 connected by respective rules 384 and 386 to sensor 356. The low sodium concentration indication is utilized in conjunction with long term trending information to determine the condition of the sodium sensor itself.

In order to obtain this long term trending information, three indications from the first subsystem of FIG. 5, as applied to this particular sodium sensor, are utilized, such indications being a sharp drop indication 176, a steady indication 188 and the last five average reading 105. Time is propagated in the subsystem of FIG. 8 from a time sensor node 390. In the absence of a drop, current time is propagated via rule 392 to be continuously updated by node 394 connected to the drop indication by a paralt rule 396. If a drop does occur, another paralt rule 398 cuts off propagation of time via rule 392 such that node 394 stores the time, $T'_0$, at which the sensor reading drop occurred. Node 400 receives time $T_0$ propagated by rule 402 and the current time propagated by rule 404 and functions to continuously obtain the duration of time since the drop occurred. Paralt rule 396, which fires when there is a sensor reading drop, functions to keep node 394 in an updated state, in the absence of which rule 402 would not fire to propagate time $T_0$ to node 400.

In a similar fashion, if the sensor reading becomes steady, paralt rule 406 cuts off transmission of time via rule 408 to node 410 which, made valid by paralt rule 412, stores the intial time $T'_0$ at which the steady indication occurred. This time, propagated by rule 414 is subtracted from the current time propagated by rule 416, in node 418 to obtain an indication of the duration of the steady reading.

If a recent drop has occurred, there may be some indication that the sodium sensor has been switched to the polisher path. If the reading becomes steady and in the low sensor range, further evidence of sensor polisher path operation is indicated. To make this determination, node 420 receives the duration of steady reading from node 418 via rule 422, the time since the sensor reading drop from node 400 via rule 424, and the low sensor reading from node 382 via rule 426. A further input in the determination is communicated via rule 430 from node 432 which derives an indication of whether or not the particular sensor reading is equal to the system average. This indication is obtained in a manner similar to that of FIG. 6 by providing an average of all the sodium sensor outputs in the system, from node 434 to node 436 via rule 438. The sensor reading itself is communicated via rule 440 to the node which then subtracts the system average from the sensor reading and provides the results to node 432 via rule 442. If, in fact, the sensor reading is equal to the system average, then this would contribute disbelief in the idea that the sensor was on the polisher path.

The arrangement of FIG. 8 also provides relatively long term trending information. The average of the last five readings is communicated via rule 444 to node 446 which stores the values over a 4-hour period, for example, and takes the oldest average from 4 hours ago and subtracts it from the latest average to obtain the change over the 4 hours. The relative 4 hour trend is obtained at node 448 connected to the 4 hour trend node 446 by rule 450 and connected to the average of the last 5 node 105 by rule 452. Information relative to the trend propagated by rule 454 and the relative trend propagated by rule 456 will allow node 458 to determine whether or not the trend is positive. If the drive is positive and steady (i.e. very small slope and few or no irregular variations in amplitude) then this may lead to the conclusion that the tubing in the sodium sensor has ruptured and ammonia is leaking into the sample stream. Node 460 connected to node 418 by rule 462 determines from the information of mode 418 whether or not there has been 4 hours of steady sensor reading. This fact, together with the positive trend are coupled to AND function 464 such that when both are present, rule 466 will propagate the belief to node 468 that there has been a rupture in the tubing. This belief is tempered, however, by disbelief propagated via rule 470 indicative of the sensor reading being equal to the system average.

OR function 472 takes the highest confidence of a possible tubing rupture or sensor being on the polisher path and propagates it via rule 474 to node 476 for determination of whether or not a sensor malfunction has actually occurred. In the absence of any malfunction, rule 480 propagates the belief in a high sodium concentration to node 482 which establishes a validated belief. Similarly, an increasing sensor reading from node 180 is propagated by rule 484 to node 486 providing an indication of validated increasing sodium concentration.

If not 476 indicates that there has been a sensor malfunction, a paralt rule 488 will modify the sufficiency and necessity functions of rule 480 to change the belief in a validated high sodium concentration. Similarly, with the presence of a malfunction, paralt rule 490 will modify the sufficiency and necessity functions of rule 484 to change the belief in a validated increasing sodium concentration.

Thus having means for obtaining validated sensor indications, the computer control system establishes a third type of subsystem which utilizes the validated sensor indications to come to some valid conclusion relative to components of the operating system being diagnosed. For the steam turbine power plant of FIG. 1, validated sensor readings are obtained at the influent and effluent of a particular component to make the malfunction diagnosis.

Figure 10:
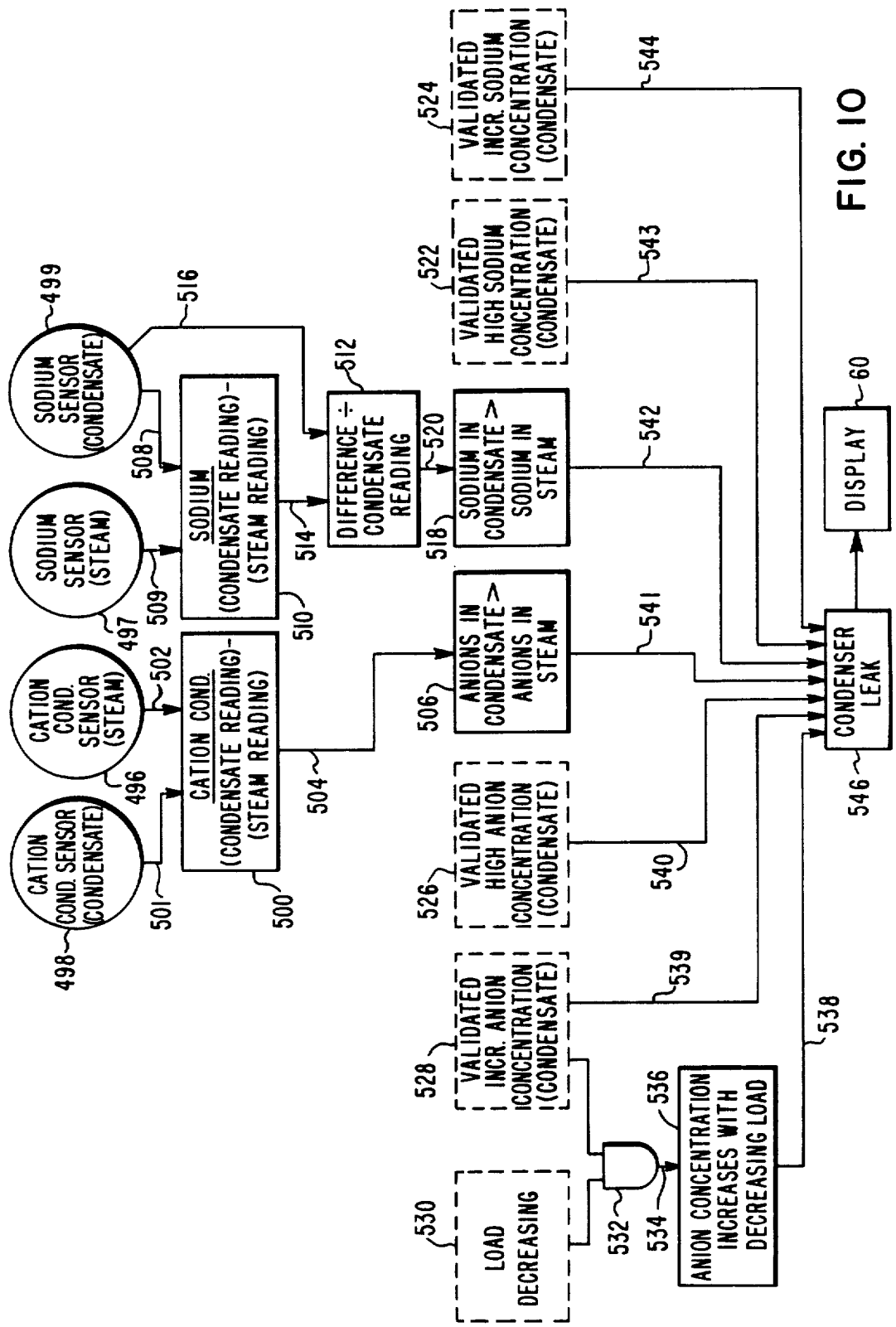
FIG. 10 is a nodal diagram subsystem illustrating the propagation of belief relative to a certain malfunction of a component of FIG. 1.

By way of example, FIG. 10 illustrates a third type of subsystem which can diagnose whether or not condenser 36 has a leak, the consequence of which would be to allow cooling water to mix with the condensate contaminating it.

Very basically, utilizing the previously described subsystems, validated anion and sodium concentrations of the influent to condenser 36 are obtained by sensors of array 50 (FIG. 1) connected to the steam line and validated anion and sodium concentrations of the effluent of condenser 36 are obtained by sensors of array 54 connected to the condensate line.

In FIG. 10, sensors 496 and 497 are respective cation conductivity and sodium sensors connected to the steam path while sensors 498 and 499 are respective cation conductivity and sodium sensors connected in the condensate path. Since the steam turbine is chemically inactive, steam and condensate sensor readings should be identical in the absence of any condenser leak. With respect to the cation conductivity reading, node 500 receives respective condensate and steam sensor values via rules 501 and 502 to compute the difference therebetween. If the results are positive by more than a predetermined amount, the belief is propagated via rule 504 to node 506 which establishes that the anion concentration in the condensate is greater than the anion concentration in the steam, a condition which may indicate a leaky condenser since the anion concentrations should be equal.

Sodium sensor readings are propagated by rules 508 and 509 to node 510 to obtain a difference in the sodium concentrations in the condensate and steam. Since the sodium sensor provides such a wide dynamic range, the relative difference is obtained at node 512 to make sure that the difference is significant. The ratio is obtained by dividing the difference propagated via rule 514 by the actual sensor reading propagated by rule 516. If the relative difference is significant, propagation to node 518 via rule 520 results in the determination that the sodium in the condensate is greater than the sodium in steam, thereby lending to the concern that there is a condenser leak since the two readings should be similar.

Other factors influencing the determination of a condenser leak would be the existence of a validated high or increasing sodium concentration in the condensate, as depicted at nodes 522 and 524 as well as a validated high or increasing anion level in the condensate as depicted at nodes 526 and 528. These latter four node results would come from identical subsystems as described in FIGS. 8 and 6 as applied to the sensors of FIGS. 10.

Another type of sensor which may be utilized in the plant of FIG. 1 provides an indication of turbine load. The subsystem of FIG. 5 as applied to the load sensor would reveal information including that illustrated at node 530 indicative of a decreasing load. If the condenser is leaking, the leak would be at a constant rate. With less load, there is less steam being condensed and the dilution of the leak is reduced such that the anion concentration in the condensate will increase. AND function 532 is responsive to a decreasing load as well as a validated increasing anion concentration to propagate, via rule 534 the belief that the anion concentration is increasing with decreasing load, as specified at node 536.

The conditions propagated via rules 538 through 544 to condenser leak malfunction node 546 individually do no more than create concern, some more than others. Conversely, the absence of such conditions influence the negative belief in a condenser leak. Collectively, however, strong evidence of the condenser leak malfunction (or lack thereof) may be obtained and presented on display 60.

Accordingly, diagnostic apparatus has been described which utilizes, in a preferred embodiment, an expert system to establish a first type of subsystem which obtains certain information relative to the output of an associated sensor. This information may then subsequently be used in a second type of subsystem which obtains an indication as to the validity of that sensor's output conclusions. A third type of subsystem utilizes validated sensor indications to obtain malfunction indications of the system being diagnosed. In the example provided, valid data relative to the influent and effluent of the condenser was utilized to diagnose a possible condenser leak. The same principles would apply to other components of the system such as the determination of condensate polisher exhaustion from polishers 40 of FIG. 1 by obtaining validated data relative to its influent and effluent by sensors of arrays 54 and 55. The establishment of these subsystems allows simultaneous determination of these component malfunctions as well as the determination of malfunctions in the sensor themselves.

Although FIG. 1 illustrates the sensor data being directly connected to the diagnostic computer 58, it is to be understood that such data at the plant could initially be collected and stored at the plant for subsequent transmission to a remote location where the diagnosis would be performed, such as described and claimed in copending application Ser. No. 605,703, filed Apr. 30, 1984, now U.S. Pat. 4,517,468.

Figure 11:
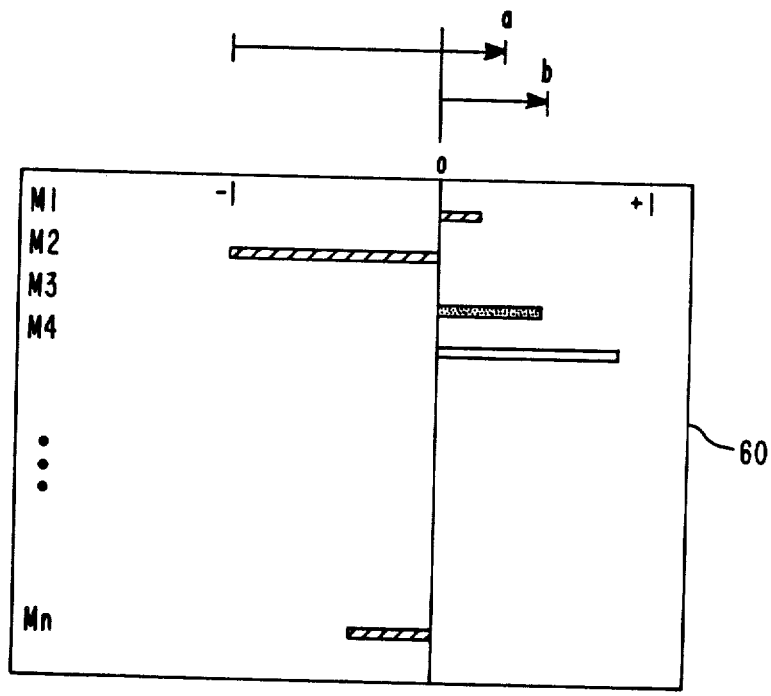
FIG. 11 illustrates one type of display for presentation of possible malfunctions.

FIG. 11 illustrates one of many different displays which may be utilized to convey malfunction information to a system operator. The left-hand side of display 60 lists all possible malfunctions M1 to Mn. These malfunctions would be spelled out in an actual display. Confidence in the malfunction is displayed as a horizontal bar which can occupy the scale between $-1$ and $+1$ on the display.

If the display is in color, any bar ranging from the zero position (the vertical line) in a negative direction or in a positive direction up to a distance of a (see scale at top of the figure) may be displayed as the color green indicating little or no concern. A confidence factor calculated to have a value greater than a but less than b may be displayed in a second color such as yellow, signifying a situation of some concern. Confidence factors calculated to have a value greater than b may be displayed in a third color such as red, indicative of great concern. For the display example of FIG. 11 therefor, malfunctions 1, 2, and n would be of no concern to the operator, malfunction M3 represents a condition which should be watched, and malfunction M4 a condition for which action may need to be taken. By way of example, distance a may correspond to a confidence factor of 0.3 and distance b may correspond to a confidence factor of 0.5.

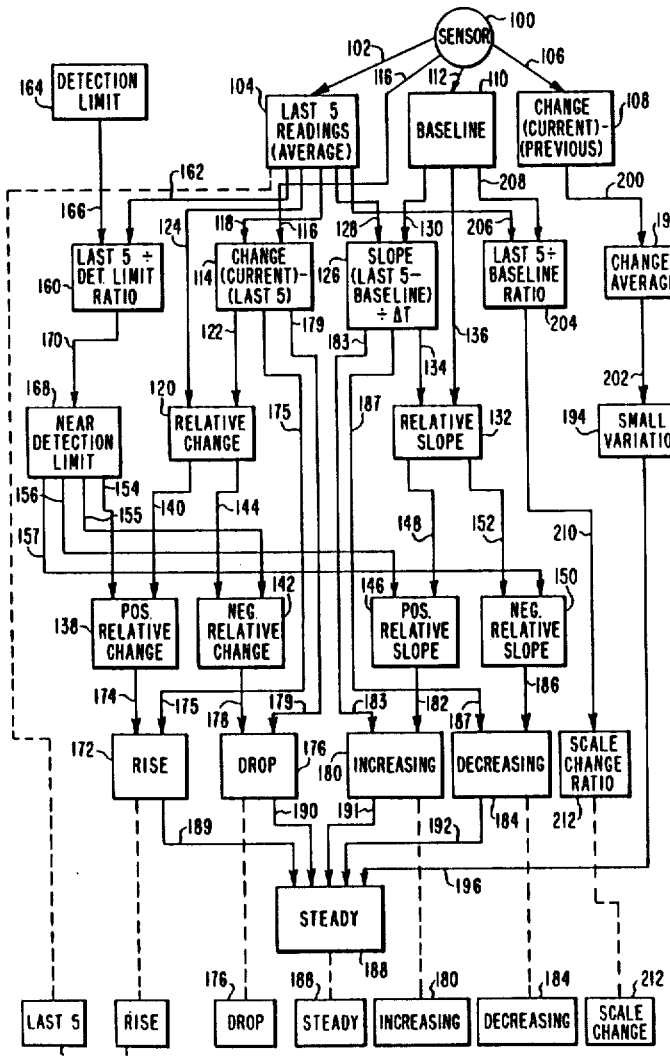

What is claimed:

1. Diagnostic apparatus for monitoring an operating system subject to malfunctions, comprising:
   (A) a plurality of sensors providing signals indicative of predetermined parameters of said system;
   (B) control means operable to establish a first subsystem for each of a selected number of said sensors and including means to periodically obtain readings of sensor output signals for providing particular indications of sensor output reading changes, if any;
   (C) said control means operable to establish a second subsystem responsive to selected sensor readings as well as selected ones of said change indications provided by said first subsystem to provide validated conclusions relative to a sensor signal with each having a certain confidence factor in the validity of the conclusion; and
   (D) said control means operable to establish at least a third subsystem responsive to sensor signals as well as said validated conclusions relative to the sensor signals to provide indications of possible malfunctions in said operating system.

2. Apparatus according to claim 1 wherein:
   (A) said indications include whether or not said sensor readings:
      (i) have sharply increased or decreased in a past first period of time;
      (ii) have slowly increased or decreased in a past second and greater period of time; or
      (iii) are relatively steady during said time periods.

3. Apparatus according to claim 2 wherein:
   (A) said first subsystem additionally provides an indication of the average of a predetermined number of sequential readings of a sensor.

4. Apparatus according to claim 2 wherein:
   (A) at least one type of said sensors includes means for changing the sensor scale; and
   (B) said first subsystem additionally provides an indication of whether a scale change has been made during said second period of time.

5. Apparatus according to claim 2 wherein:
   (A) said first subsystem is operable to obtain an indication of the difference between two sequential readings of a sensor and to use successive difference indications in determining whether the sensor output signal is relatively steady.

6. Apparatus according to claim 2 wherein:
   (A) said second period of time is at least six times greater than said first period of time.

7. Apparatus according to claim 2 wherein:
   (A) selected sensors have a respective detection limit past which the sensor output signal may be questionable;
   (B) said first subsystem is operable to determine operation of a sensor near its detection limit and modify its indications provided with respect to increasing or decreasing sensor signals.

8. Apparatus according to claim 1 wherein:
   (A) said operating system includes a plurality of identical sensors disposed throughout the system; and
   (B) said second subsystem is operable to determine whether one of said identical sensors is malfunctioning in response to:
      (i) the sensor signal itself,
      (ii) predetermined indications provided by said first subsystem, and
      (iii) the average signal of all of said identical sensors.

9. Apparatus according to claim 8 wherein:
   (A) said second subsystem is operable to provide a validated sensor signal indication, in the absence of said sensor malfunction.

10. Apparatus according to claim 1 wherein:
    (A) said operating system includes a steam turbine, a steam supply for supplying steam to said turbine, a condenser for receiving exhaust steam for return of condensate to said steam supply and water treatment means in the return path;
    (B) said system includes a plurality of sensor arrays disposed about said system for monitoring various chemical parameters in the steam path and condensate path of said operating system.

11. Apparatus according to claim 10 wherein:
    (A) at least two of said arrays each include an acid cation exchanged conductivity sensor having:
       (i) a cation resin bed which removes cations present in a sample and replaces them with hydrogen ions, and
       (ii) a conductivity cell responsive to the cation exchanged sample to provide an output signal indicative of anion concentration in the sample,
    (B) said second subsystem is operable to provide validated indications of high anion concentration as well as increasing anion concentration;
    (C) said second subsystem is operable to determine whether said cation resin bed is exhausted and to reduce the confidence in said validated indications if said resin bed is exhausted.

12. Apparatus according to claim 11 wherein:
    (A) said second subsystem is operable to determine whether said conductivity cell is malfunctioning and to reduce the confidence in said validated indications if it is malfunctioning.

13. Apparatus according to claim 11 wherein:
    (A) said second subsystem is operable to determine whether said sensor is in an incorrect operating condition and to reduce the confidence in said validated indications if it is in said incorrect operating condition.

14. Apparatus according to claim 13 wherein:
    (A) said incorrect operating condition includes a sensor in a test condition.

15. Apparatus according to claim 13 wherein:
    (A) said incorrect operating condition includes a sensor whose output reading is on an incorrect scale.

16. Apparatus according to claim 10 wherein:
    (A) at least two of said arrays each include a sodium sensor of the type which includes:
       (i) a first path for conduction of a sample and having tubing immersed in a controlled ammonia environment which diffuses into said tubing and sample, (ii) a polisher path for removal of sodium in the sample before introduction into said tubing, and (iii) output electrodes responsive to the sample emanating from said tubing to provide an output signal indicative of sodium concentration in the sample, (B) said second subsystem is operable to provide validated indications of high sodium concentration as well as increasing sodium concentration;

(C) said second subsystem is operable to determine whether said tubing is ruptured and to reduce the confidence in said validated high or increasing sodium concentration indications if said tubing is ruptured.

17. Apparatus according to claim 16 wherein:

(A) said second subsystem is operable to determine whether said sample is being directed through said polisher path and to reduce the confidence in said validated high or increasing sodium concentration indications if said sample is being directed through said polisher path.

18. Apparatus according to claim 16 wherein:

(A) said second subsystem is operable to accumulate successive sodium sensor readings over a period of at least several hours to make said determination of tubing rupture.

19. Apparatus according to claim 10 which includes:

(A) at least first and second sensor arrays each including:
(i) acid cation exchanged conductivity sensor for providing an indication of anion concentration in a sample, and
(ii) a sodium sensor for providing an indication of sodium concentration in said sample, (B) said first sensor array being operable to sample the influent of a component of said operating system;

(C) said second sensor array being operable to sample the effluent of said component;

(D) said third subsystem being responsive to:
(i) influent anion and sodium concentration signals from said sensors;
(ii) effluent anion and sodium concentration signals from said sensors, and
(iii) validated anion and sodium concentration indications provided by said second subsystems associated with said sensors, to determine a possible malfunction in said component.

20. Apparatus according to claim 19 wherein:

(A) said component is said condenser.

21. Apparatus according to claim 19 wherein:

(A) said component is part of said water treatment means.

22. Apparatus according to claim 1 which includes:

(A) display means for displaying said indications of possible malfunctions.

23. Apparatus according to claim 22 wherein:

(A) said possible malfunctions are displayed on a scale of $-1$ to $+1$ corresponding to definitely not present to definitely present.

24. Diagnostic apparatus for diagnosing an operating system subject to malfunctions and having a plurality of sensors providing signals related to system parameters, comprising:

(A) A computer having a memory;

(B) means for inputting said sensor signals into said computer memory;

(C) means for storing within the computer's memory a rule base pertinent to the particular operating system being diagnosed;

(D) said rule base including a first set of rules applicable to any sensor for determining sensor output signal changes, if any;

(E) said rule base including a second set of rules applicable to any sensor for determining sensor malfunction and for validating sensor indications in the absence of a sensor malfunction;

(F) said rule base including a third set of rules for determining malfunctions of said operating system based on conclusions reached by said first and second sets of rules.

25. Apparatus according to claim 24 wherein:

(A) said operating system includes a steam turbine, a steam supply for supplying steam to said turbine, a condenser for receiving exhaust steam for return of condensate to said steam supply and water treatment means in the return path;

(B) said system includes a plurality of sensor arrays disposed about said system for monitoring various chemical parameters in the steam path and condensate path of said operating system.

26. Apparaus according to claim 25 wherein:

(A) at least two of said arrays each include an acid cation exchanged conductivity sensor having:
(i) a cation resin bed which removes cations present in a sample and replaces them with hydrogen ions, and
(ii) a conductivity cell responsive to the cation exchanged sample to provide an output signal indicative of anion concentration in the sample, (B) said second set of rules is operable to provide validated indications of high anion concentration as well as increasing anion concentration;

(C) said second set of rules is operable to determine whether said cation resin bed is exhausted and to reduce the confidence in said validated indications if said resin bed is exhausted.

27. Apparatus according to claim 26 wherein:

(A) said second set of rules is operable to determine whether said conductivity cell is malfunctioning and to reduce the confidence in said validated indications if it is malfunctioning.

28. Apparatus according to claim 26 wherein:

(A) said second set of rules is operable to determine whether said sensor is in an incorrect operating condition and to reduce the confidence in said validated indications if it is in said incorrect operating condition.

29. Apparatus according to claim 28 wherein:

(A) said incorrect operating condition includes a sensor in a test condition.

30. Apparatus according to claim 28 wherein:

(A) said incorrect operating condition includes a sensor whose output reading is on an incorrect scale.

31. Apparatus according to claim 25 wherein:

(A) at least two of said arrays each include a sodium sensor of the type which includes:
(i) a first path for a sample and having tubing immersed in a controlled ammonia environment which diffuses into said tubing and sample,
(ii) a polisher path for removal of sodium in the sample before introduction into said tubing, and
(iii) output electrodes responsive to the sample emanating from said tubing to provide an output signal indicative of sodium concentration in the sample,
(B) said second set of rules is operable to provide validated indications of high sodium concentration as well as increasing sodium concentration;
(C) said second set of rules is operable to determine whether said tubing is ruptured and to reduce the confidence in said validated high or increasing sodium concentration indications if said tubing is ruptured.

32. Apparatus according to claim 31 wherein:
(A) said second set of rules is operable to determine whether said sample is being directed through said polisher path and to reduce the confidence in said validated high or increasing sodium concentration indications if said sample is being directed through said polisher path.

33. Apparatus according to claim 25 which includes:
(A) at least first and second sensor arrays each including:
   (i) an acid cation exchanged conducting sensor for providing an indication of anion concentration in a sample, and
   (ii) a sodium sensor for providing an indication of sodium concentration in said sample,
(B) said first sensor array being operable to sample the influent of a component of said operating system;
(C) said second sensor array being operable to sample the effluent of said component; and wherein
(D) said third set of rules is operable to determine a possible malfunction in said component based on:
   (i) influent anion and sodium concentration signals from said sensors;
   (ii) effluent anion and sodium concentration signals from said sensors, and
   (iii) validated anion and sodium concentration indications determined by said second set of rules.

34. Apparatus according to claim 33 wherein:
(A) said component is said condenser.

35. Apparatus according to claim 33 wherein:
(A) said component is part of said water treatment means.

36. Apparatus according to claim 24 which includes:
(A) display means for displaying said indications of possible malfunctions.

37. Apparatus according to claim 36 wherein:
(A) said possible malfunctions are displayed on a scale of $-1$ to $+1$ corresponding to definitely not present to definitely present.

* * * * *

UNITED STATES PATENT AND TRADEMARK OFFICE
CERTIFICATE OF CORRECTION

PATENT NO. : 4,644,479

DATED : February 17, 1987

INVENTOR(S) : Christian T. Kemper, et al

Page 1 of 10

It is certified that error appears in the above-identified patent and that said Letters Patent is hereby corrected as shown below:

The title page should be deleted to appear as per attached title page.

Figures 1-9 of the drawings should be deleted to be replaced with figures 1-11 as shown on the attached sheets.

Signed and Sealed this

Twenty-seventh Day of October, 1987

Attest:

DONALD J. QUIGG

Attesting Officer

Commissioner of Patents and Trademarks

United States Patent [19]

Kemper et al.

[11] Patent Number: 4,644,479
[45] Date of Patent: Feb. 17, 1987

[54] DIAGNOSTIC APPARATUS

[75] Inventors: Christian T. Kemper, Winter Park; James C. Bellows, Seminole, both of Fla.; Pamela J. Kleinosky, Philadelphia, Pa.

[73] Assignee: Westinghouse Electric Corp., Pittsburgh, Pa.

[21] Appl. No.: 636,195

[22] Filed: Jul. 31, 1984

[51] Int. Cl.⁴ ................ G06F 15/46; G06F 11/30
[52] U.S. Cl. ................... 364/550; 364/492; 364/554
[58] Field of Search ............ 364/431.01, 550, 551, 364/554, 556, 492, 494

[56] References Cited

U.S. PATENT DOCUMENTS

| | | | |
|---|---|---|---|
| 4,302,813 | 11/1981 | Kurihara et al. | 364/494 X |
| 4,328,556 | 5/1982 | Abe et al. | 364/492 X |
| 4,389,706 | 6/1983 | Gomola et al. | 364/492 X |
| 4,404,637 | 9/1983 | Walters et al. | 364/494 |
| 4,471,446 | 9/1984 | Podolsky et al. | 364/494 |
| 4,517,468 | 5/1985 | Kemper et al. | 364/492 X |

OTHER PUBLICATIONS

Fox et al: Techniques for Sensor Based Diagnosis, Proceedings of the Eighth International Joint Conference on Artificial Intelligence, IJCAI-83, vol. I, pp. 158-163.

Primary Examiner—Felix D. Gruber
Attorney, Agent, or Firm—D. Schron

[57] ABSTRACT

Diagnostic apparatus utilized to monitor a steam turbine-generator power plant. A plurality of sensors around the plant provide data to the diagnostic apparatus which utilizes a digital computer to come to some conclusion relative to actual or impending malfunctions in the plant components. The computer utilizes an expert system diagnosis which establishes a plurality of subsystems which are generic and can be applied to any sensor to obtain indications of (a) sensor output movement, (b) validated sensor readings and (c) malfunction indications based on conclusions reached in (a) and (b).

37 Claims, 12 Drawing Figures